Dec. 18, 1956
A. V. BRIEGHEL-MÜLLER
2,774,693
METHOD FOR PURIFYING SUGAR JUICES
BY LIMING AND CARBONATION
Filed March 21, 1951
3 Sheets-Sheet 3
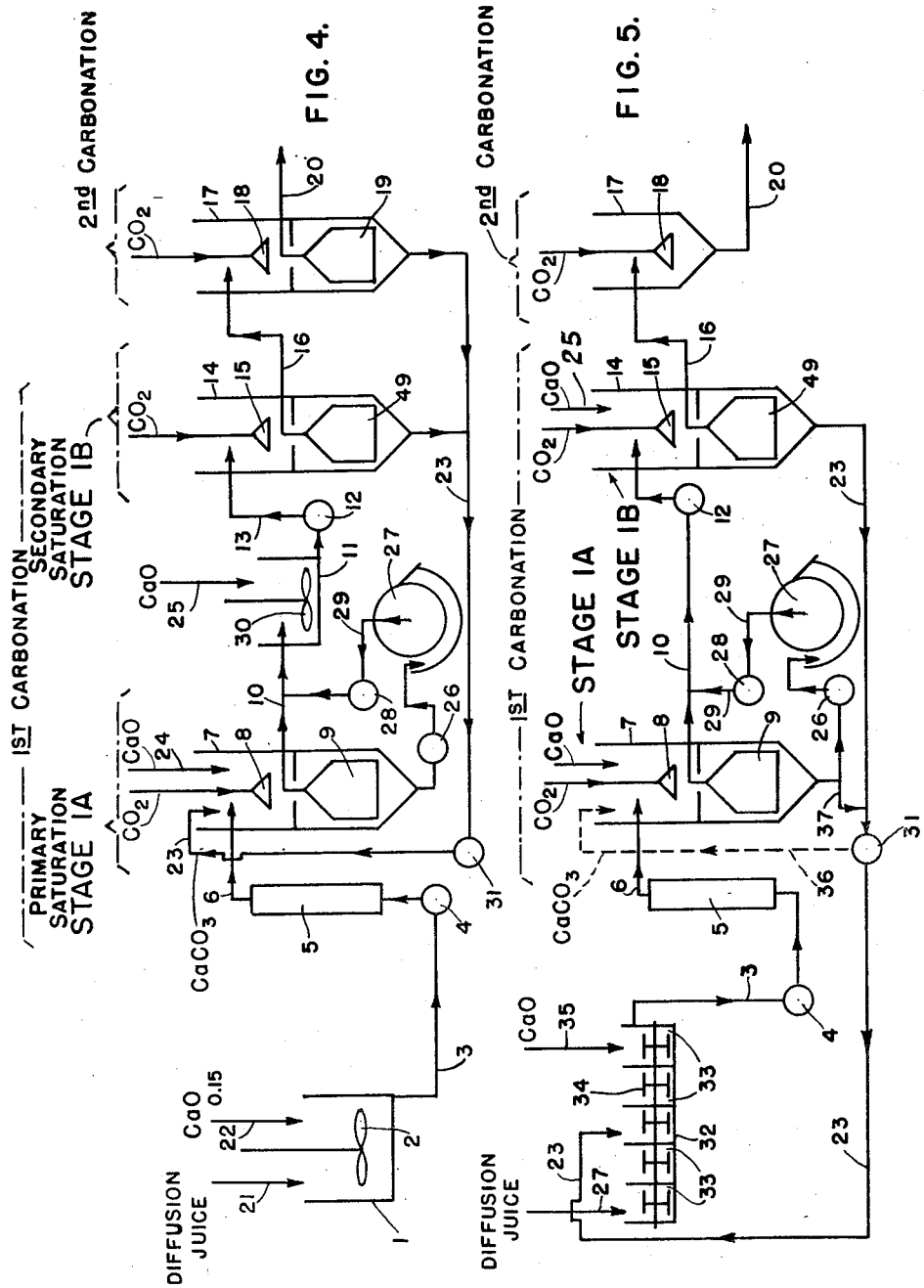
INVENTOR:
ARNE VIGAND BRIEGHEL-MÜLLER,
BY
Arthur Middleton
ATTORNEY

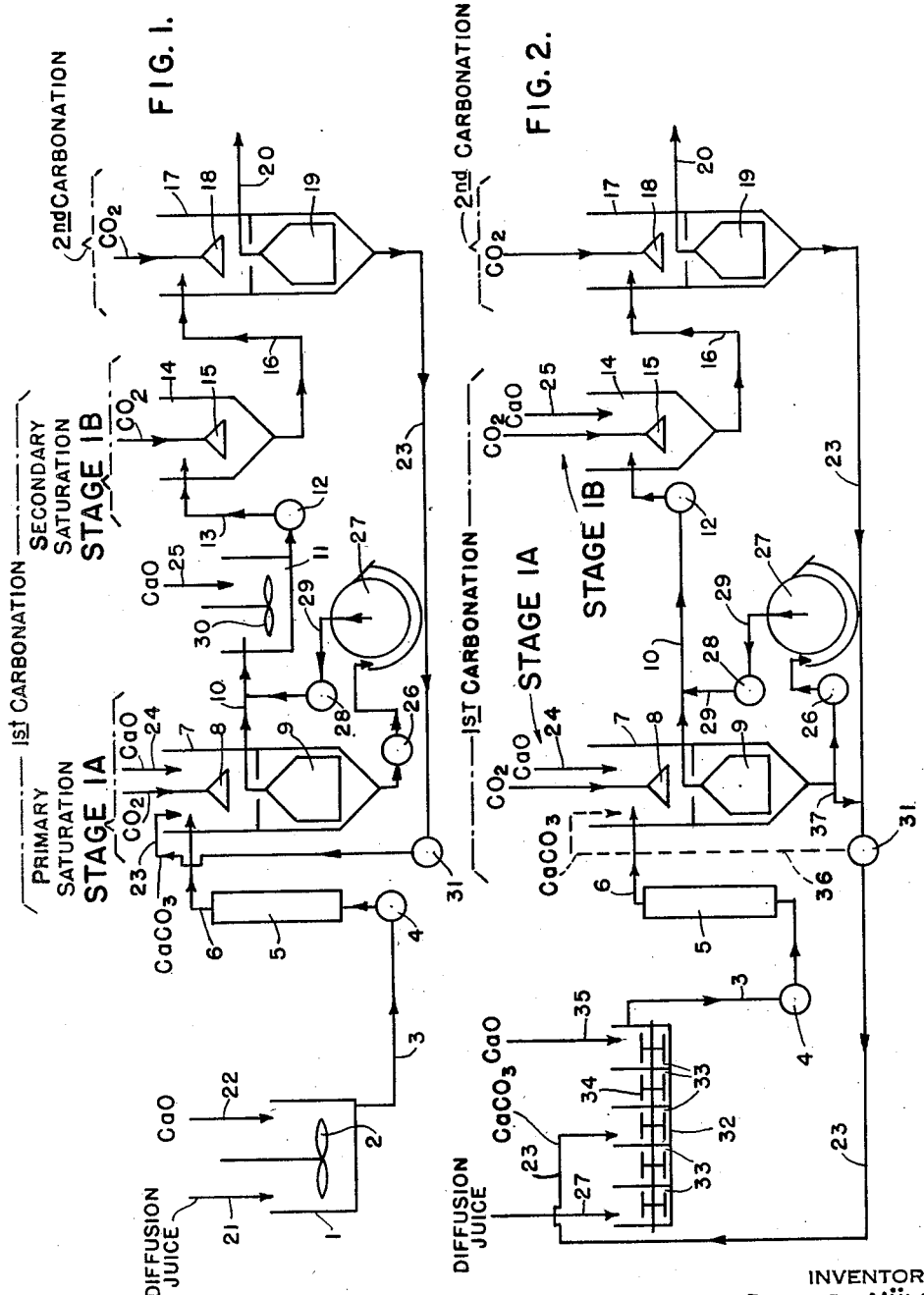

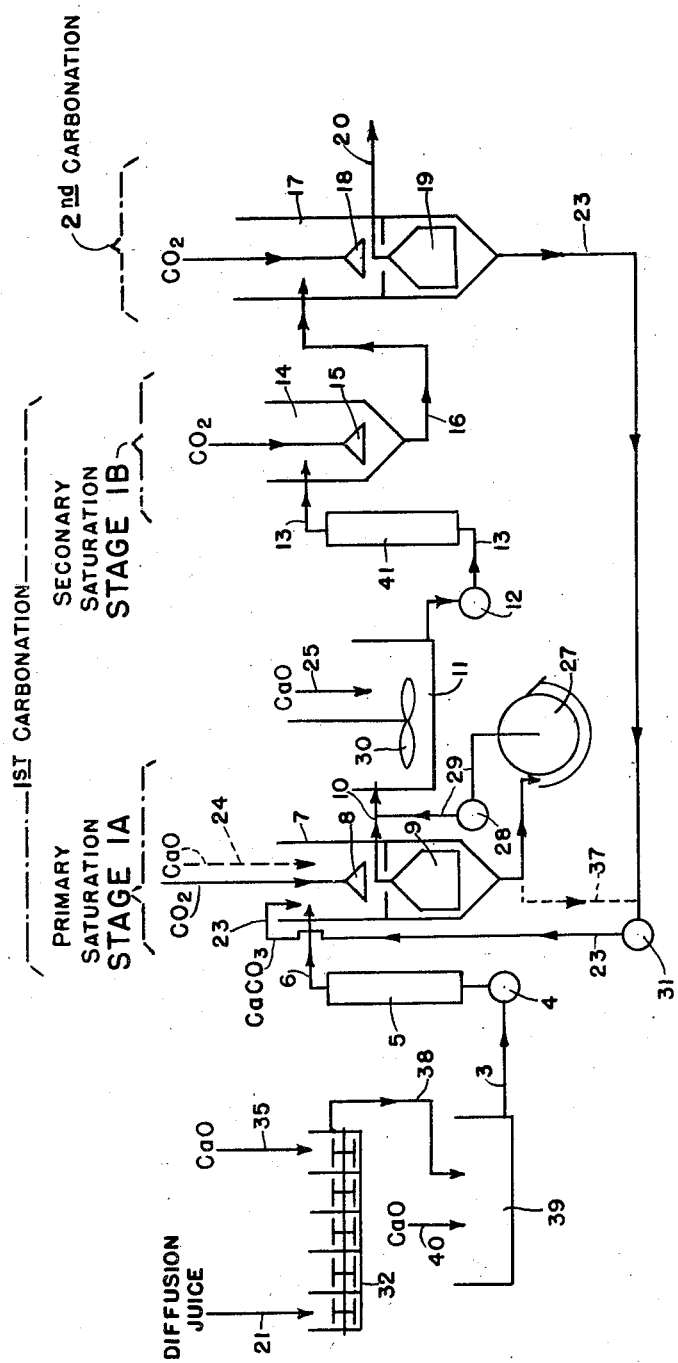

United States Patent Office 2,774,693
Patented Dec. 18, 1956

2,774,693

METHOD FOR PURIFYING SUGAR JUICES BY LIMING AND CARBONATION

Arne Vigand Brieghel-Müller, Gentofte, Denmark, assignor to Aktieselskabet de Danske Sukkerfabrikker, Copenhagen, Denmark, a corporation of Denmark Application March 21, 1951, Serial No. 216,810

Claims priority, application Sweden March 24, 1950

9 Claims. (Cl. 127—50)

This invention relates to a method for the purification of sugar juices by means of liming and saturation, whereby the juice is subjected to so-called first saturation and subsequently to so-called second saturation.

The main object of this invention is to provide a method for carrying out the saturation in such a way that even with the use of smaller quantities of lime (CaO) there can be achieved the same and even better purification than with the methods heretofore used.

A more specific object is to produce from the saturation operation a cleaner carbonate precipitate for return to a preceding treatment step, that is a carbonate substantially free from colloidal matter.

These objects are attained according to this invention by means of subdividing the so-called first saturation into two saturation stages herein to be identified as stages IA and IB respectively with liming and addition of calcium carbonate in or before the first stage and the provision of a precipitate removal step disposed between the two stages. According to this invention the juice prior to saturation is stabilized which for the purpose of this invention means that its colloidal impurities are rendered into such a condition that neither in this stabilization stage nor in the following liming and saturation stages will they coagulate out in the form of flocculations, but will adhere to the calcium carbonate if provision is made for a sufficient quantity of calcium carbonate to be present. This stabilization is achieved by the addition to the juice of CaO to an alkalinity of not above 0.5 preferably 0.02 to 0.03 gram CaO per 100 milliliters and by the use of a liming agent the alkalinity of which does not exceed 0.25 gram CaO per 100 milliliters. That is to say, the juice after stabilization is partially limed and subjected to addition of calcium carbonate such as is obtained in the form of saturation sludge or slurry, and is then saturated in stage IA and decanted for precipitate removal, and the decanted juice during or after additional liming is subjected to a new saturation step or stage IB where it is brought to the usual first saturation alkalinity of around 0.08 gram CaO per 100 milliliters.

As a consequence of this stabilization, if the juice before or during the liming and saturation is subjected to addditional calcium carbonate, there is obtained the precipitate or mud in a form which makes it possible to separate the liquid or most of it from the precipitate by decantation in a relatively short time, which in addition makes it possible to employ a continuous decantation process. This in turn makes it possible to carry out the above-mentioned division of the first saturation into two saturation stages, so that the necessary quantity of lime is added in two stages and that the juice during or after each liming can be subjected to a separate saturation.

From this there follows that it is possible in the primary liming and saturation stages IA, even with a considerably smaller amount of lime being used than in the conventional first saturation, to separate the largest part of the impurities from the juice, significantly the colloidal impurities so that the secondary liming and saturation stage IB can work in an environment nearly free of colloids, whereby there is achieved as nearly complete a precipitation of all the impurities as it is possible to precipitate by liming and saturation.

The juice obtained from the saturation stage IB is thereafter subjected to the so-called second saturation in which it is saturated down to an alkalinity of approximately 0.02 gram CaO per 100 milliliters. This second saturation may be carried out in the conventional manner whereby the juice derived from the aforementioned saturation stage IB is first separated from the precipitate by decantation and/or filtration.

Although the greatest purification is obtained in the conventional process by reducing the alkalinity of the limed juice to 0.02 gram CaO per 100 milliliters, this must be carried out through first and second carbonation and the juice must be filtered between the two for removing the impurities precipitated at the higher alkalinity of first saturation 0.08 gram CaO per 100 milliliters which impurities would redissolve in the second saturation which is carried to an alkalinity of .02 gram CaO per 100 milliliters. This filtration step thus is interposed between what is conventionally termed as first saturation and as second saturation, or as first carbonation and as second carbonation, whereas the juice derived from these two treatment phases is conventionally termed first-saturation juice and second-saturation juice or first-carbonation juice and second-carbonation juice.

According to this invention, the saturated juice from stage IB may be sent directly to second saturation, that is without subjecting it to the conventional filtration step conventionally interposed between the first and second saturation, because the saturation of the juice in stage IB is carried out in an environment that is practically free from precipitated colloidal impurities under which condition color substances in the juice are absorbed on the calcium carbonate precipitate in a form in which they are able to tolerate or withstand the lower alkalinity of second saturation without going back into solution.

According to this invention, if the diffusion juice is stabilized in the manner above set forth, the impurities precipitated out of the juice during the stabilization step and also during the following steps of liming and first-carbonation will be in the form of fine dehydrated dispersed particles which readily attach themselves to the calcium carbonate. That form of the precipitated impurities is in contrast to the more voluminous flocculations produced in the conventional processes where stronger lime bearing agents are added to the diffusion juice.

The present process has the further advantage that supersaturation of the juice with lime salts, as is normally found in second saturation, is avoided because of the significant presence of a relatively large proportion of crystalline $CaCO_3$ maintained in the juice. This reduces the usual troubles due to incrustation or scaling of equipment surfaces.

In accordance with the invention it can be furthermore advantageous to have the sludge from the primary saturation and decantation stage IA filtered and the filtrate mixed with the decanted juice before the lime is added for the secondary saturation stage IB, so that all of the juice can go forward to further processing. However, this filtrate can also be made useful in other ways, namely by using it for slaking of the liming agent, whereby complete utilization of the sugar juice can be attained.

In accordance with this invention it is furthermore advantageous to utilize the precipitate slurry settled out of the saturation juice from stage IB or precipitate slurry settled out from second-saturation juice, as carbonate addition in a preceding step in the process.

By thus returning a part of the lime expended in the process as calcium carbonate sludge free from colloidal matter, the fresh lime consumption is further reduced. A further considerable advantage is obtained in that as the second carbonation precipitate may be settled out of the juice and utilized in slurry form in a previous step in the process, it is possible to eliminate the heretofore employed second-carbonation juice filter station.

In some cases the amount of precipitate slurry obtainable from the saturation stage IB or from second-saturation is insufficient to meet the requirements of the initial stabilization above defined, and in such cases that amount of slurry can be increased by the addition thereto of part of the precipitate slurry derived from the first decantation.

Summarizing, this invention proposes to stabilize the juice by a specific manner of conducting the initial liming operation, saturating the juice in saturation stage IA in the presence of carbonate obtained as slurry from second saturation, then separating the carbonate precipitate from the juice together with colloidal matter formed as finely dispersed particles which due to the initial stabilization of the juice contain only small amounts of water and which have been adsorbed in the carbonate, passing the separated juice to saturation IB where carbonate forms in a substantially colloid free environment, and then on to second saturation which in turn furnishes a clear or colloid free carbonate for use as carbonate addition in saturation stage IA or else in the initial liming stage or in both.

In the practice the principles of the invention may be utilized in various ways and for the purpose of illustration some examples are given below with reference to the accompanying drawings in which Fig. 1 diagrammatically shows divided first carbonation applied in connection with a preceding stabilization and with return of sludge from the second carbonation to carbonation stage IA.

Fig. 2 in similar manner shows divided first carbonation applied in connection with a preceding stabilization, this step being followed by sludge addition and preliming, the sludge return from the second carbonation being supplemented by a part of the sludge from carbonation stage IA.

Fig. 3 likewise diagrammatically shows an application of divided first carbonation by which the juice produced in a juice relay station some distance from the sugar factory has to be limed to a rather high alkalinity without preceding sludge addition.

Fig. 4 shows a system similar to Fig. 1 but differing from this in that a precipitate removing step is added in carbonation stage IB and that the sludge return from the second carbonation is supplemented by sludge from carbonation stage IB.

Fig. 5 shows a system similar to Fig. 2 but differing from this in that a precipitate removing step in stage IB and that the sludge return from the second carbonation is substituted by sludge from carbonation stage IB.

The installation or system shown in Figure 1 has a tank 1 with a stirrer 2, to which tank 1 the diffusion juice can be fed by pipe 21, while through pipe 22 a liming agent is added having an alkalinity of 0.15 gram CaO per 100 milliliters. This is added in such a quantity in relation to the diffusion juice that it produces an alkalinity of 0.02 to 0.03 gram CaO per 100 milliliters in the juice in tank 1, whereby the stabilization of the diffusion juice is achieved.

From tank 1 the stabilized diffusion juice is pumped through pipe 3 by means of a pump 4 through a preheater 5 from where the diffusion juice as through pipe 6 passes to a continuously operating combined saturation and decantation apparatus or unit 7 having a distributor 8 through which carbon dioxide can be blown into and through the diffusion juice and a decanter 9 arranged below from which decanted solution can be removed through pipe 10.

To apparatus 7 leads a conduit or pipe 23 through which is introduced a suspension of calcium carbonate precipitate contained in saturation juice which precipitate is added to the diffusion juice, as will be described in greater detail below; a pipe 24 is provided through which a liming agent can be added to the diffusion juice in apparatus 7. This liming agent is added, for instance, in a quantity corresponding to about ½ of the quantity normally required for the first saturation. In the installation described such a quantity of carbon dioxide is added through the distributor 8 that by this primary saturation stage IA the juice is saturated down to an alkalinity of approximately 0.08 gram CaO per 100 milliliters whereby the largest part of the impurities, especially the colloidal impurities, are precipitated, so that they can be separated in the decanter 9 to collect in the lower part of apparatus 7, then by means of a pump 26 to be delivered to a continuously operating filter 27 from which the filtrate by means of a pump 28 is pumped to pipe 10 where it is mixed with the decanted solution coming from the decanter 9, and through which the mixture passes to a tank 11 provided with an agitator 30.

To tank 11 leads a pipe 25 through which the liming agent is introduced, for instance in a quantity corresponding to somewhat less than half of that normally required for the first saturation, so that the juice in tank 11 is again limed up. From tank 11 the juice thus limed up is pumped by means of a pump 12 to a saturation vessel 14 provided with a distributor 15 for carbon dioxide which is introduced in such a quantity that the juice in vessel 14 is saturated down to an alkalinity of about 0.08 gram CaO per 100 milliliters. This invention teaches that with this alkalinity the precipitate formed during the saturation has the maximum ability to adsorb color substances present in the sugar juice, which can only be partly separated by treatment in apparatus 7. After the juice in tank 11 has been subjected to treatment in the saturation stage IB in vessel 14, the juice together with the precipitate slurry formed in vessel 14 passes through a pipe 16 to a continuously operating combined saturation and decanting apparatus or unit 17 similar to apparatus 7 and likewise having a distributor 18 for carbon dioxide and a decanter 19.

In apparatus 17 a second saturation is carried out down to an alkalinity of about 0.02 gram CaO per 100 milliliters in the juice, which according to this invention is possible without redissolving the color substances adsorbed on the calcium carbonate precipitate in spite of that low alkalinity. The juice leaving the decanter 19 through an effluent pipe 20 has a low content of lime and is purified to the extent that after filtration it may pass on to further treatment in the sugar process.

The precipitate slurry, which collects in the bottom of the apparatus 17 is pumped by means of pump 31 through a pipe 23 from the bottom of the apparatus 17 and as previously stated returns to saturation apparatus 7, whereby the precipitate slurry from second decantation in apparatus 17 is used as calcium carbonate addition in saturation apparatus 7, such addition being necessary according to this invention in order that the impurities in the stabilized juice may be separated in such a form that the juice itself or the largest part thereof can be separated from the precipitate by way of decantation.

Referring to the installation in accordance with Figure 2 the tank 1 of Figure 1 is replaced with a continuously operating stabilizing and liming apparatus 32 for example such as disclosed in my corresponding patent application Serial No. 177,156, filed August 2, 1950, now Patent Number 2,610,929, which consists of a horizontally elongated tank having a series of compartments 33 interconnected or communicating with one another by means of overflows and baffles and having in each compartment an agitating device 34. The diffusion juice flows through the pipe 27 to one end compartment 33, whereas the liming agent is introduced through a pipe 35 into the opposite or effluent end compartment 33, with the agitators and baffles between the chambers so arranged that a part of the liquid in each chamber is carried back to the preceding chamber countercurrent to the main flow which is in the direction from the introduction of the diffusion juice to the opposite end compartment. Thereby is achieved initially a mixture of the diffusion juice with a juice having a low alkalinity effecting stabilization, whereafter the juice as it passes through the apparatus is being mixed with a juice having higher alkalinity and is thereby limed. The liming agent is introduced in such a quantity that the alkalinity in the effluent end compartment into which the liming agent is introduced is around 0.20 gram CaO per 100 milliliters.

In the apparatus shown in Figure 2 the pipe 23 leads to stabilizing and liming apparatus 32 so that saturation slurry can be mixed with the stabilized juice already present in apparatus 32 to effect calcium carbonate addition during the liming itself. From apparatus 32, more specifically from that compartment 33 into which pipe 35 delivers CaO the partially limed juice discharges through pipe 3 and by means of pump 4 and passes through preheater 5 to apparatus 7 where the juice is treated in the same way as described above in connection with Figure 1. However, as calcium carbonate has been fed to the juice beforehand, namely in apparatus 32, it is not absolutely necessary to add calcium carbonate particles in apparatus 7 as was done in Figure 1, although this can be done and may have to be done in a fair number of cases, as through pipe 36 shown in dotted lines and connected to pipe 23.

The remaining part of the installation according to Figure 2 corresponds in general to similar parts of the installation according to Figure 1 with the exception that tank 11 is omitted and that therefore a pipe 25 for adding the liming agent, feeds directly into the saturation vessel 14. However, that arrangement can also be applied in the installation according to Figure 1. Furthermore, in the installation according to Figure 2 a connecting pipe 37 is shown to lead from the bottom of apparatus 7 to pipe 23 through which a part of the sludge from the first decanter 9 can join the slurry from decanter 19 as it flows through the pipe 23 in case the slurry from the latter decanter 19 is not available in sufficient quantity.

The installation shown in Figure 3 comprises another form of a continuously operating stabilizing apparatus 32, in which the juice is limed, for instance, to an alkalinity of 0.2 gram CaO per 100 milliliters. However, from this modified apparatus 32 the juice discharges into and passes through pipe 38 to a vessel 39 into which is fed additional liming agent through a pipe 40 by means of which further liming agent is added so that the juice attains an alkalinity of above 0.2 gram CaO per 100 milliliters, for instance 0.5 gram CaO per 100 milliliters, which in turn renders the juice bacteriologically stable. As a further consequence of this the liming of the juice can be carried out in a juice treatment relay station from which the juice for instance through the pipe 3 can go to the sugar factory proper.

Such a treatment in the juice relay station is possible with installation shown in Figure 2, but because of the fact that saturation slurry would have to be added to apparatus 32, this would only be practical where the distance between the factory and the juice relay station is very short.

It should also be noted that it is possible to omit the vessel 39 and carry out the liming in the apparatus 32, which would simplify the lime distribution.

The strong alkaline juice coming from tank 39 passes through the preheater 5 where it is heated to a temperature of 30–50° and from there to apparatus 7 where it is saturated down to an alkalinity of less than 0.05 gram CaO per 100 milliliters, preferably to around the neutrality point, for instance to 0.02, so that the juice in fact is oversaturated. This, however, produces a certain amount of coagulation which, in the absence of stabilization, takes place because of the strong liming before the addition of calcium carbonate, which by the described way of carrying out the invention is added in apparatus 7, but which could be added before the strong liming ahead of preheater 5. The above-mentioned oversaturation, which to a considerable degree promotes the decantation, is furthermore possible for the reason that it has been found that it does not promote any substantial redissolving of the precipitated pectinous and other colloidal materials, especially if the juice has been stabilized ahead of this.

The decanted liquid from the decanter 9 flows to the tank 11 where it is again limed, thereafter it is heated in preheater 41 to a temperature of 70 to 90° before it is subjected to the secondary saturation stage IB in vessel 14 and then to second saturation in apparatus 17.

It should be noted that the liming in the vessel 39 or possibly in apparatus 32 can be reduced somewhat, and instead further liming agent can be added through the pipe 24 to the juice in apparatus 7, especially in case the alkalinity of 0.05 gram CaO per 100 milliliters should be insufficient.

It should further be noted that in this installation the tank 11 can be omitted and lime feeding pipe 25 can supply the saturation vessel 14 directly.

It should be further noted that the method, which is described above in connection with the installation according to Figure 3 has the advantage that it makes possible a saving in regard to heat consumption because of the fact that the primary saturation stage IA is carried out at comparatively low temperature, for which reason the heat losses in apparatus 7, the filter 27, and the tank 11 are rather low compared with the heat losses in the corresponding places in the conventional installations and with installations according to Figure 1 and 2, where the usual practice is to work at a considerably higher temperature in the corresponding steps.

The embodiment in Figure 4 is similar to the Figure 1 embodiment except for the fact that the secondary saturation stage IB comprises a decanting vessel 49 with a discharge pipe 16 for decanted liquid leading to second carbonation tank 17, and settled out carbonate slurry passing from the bottom of the decanting vessel 49 into pipe 23.

The embodiment in Figure 5 is similar to the Figure 2 embodiment except for the fact that the carbonation and decanting unit is shown to have changed places with the carbonation vessel 14 of the secondary saturation stage IB, and that pipe 23 for returning carbonate sludge to an earlier treatment step leads from the bottom of stage IB, that is, from the decanting vessel 49.

In all three installations described above the precipitation slurry formed in the saturation vessel 14 passes together with the juice directly to saturation apparatus 17. However, it is possible to interpose a decanter or filter between the vessel 14 and apparatus 17, for instance by letting the apparatus 17 and the vessel 14 change places so the second saturation is carried out in the latter and the slurry formed or the precipitate is separated in the second saturation filter.

It should also be noted that the different above installations and the processes for which these installations are proposed can be combined in various ways some of which in fact have been set forth in the foregoing.

It is thus possible to use each of the modifications of arrangement of the drawing figures with various combinations of the apparatus 14 and 17, and furthermore it is not necessary that the decanting vessels 9, 19, and 49 be unitary with the respective carbonation devices.

It should further be noted that the installations are schematic and serve only to explain certain ways in which the plant can be arranged, that is to say many of the pumps shown may be eliminated by purposeful rearrangement of the different parts of the plant, or pumps may be used where they have not been shown. Furthermore, it may be advantageous in some cases to install surge tanks between some of the individual pieces of equipment in order to provide for a continuous treatment without interruption or for sufficient reaction time. It should be noted that the various feed pipes for the liming agent often come from a common source connected to a suitable distribtuion system whereby the total amount of liming agent can be distributed in the desired way to the individual feed pipes.

What I claim is:

1. A method for the purification of sugar juice by liming and carbonation, comprising the steps of stabilizing the sugar juice by the addition thereto of a liming reagent, the alkalinity of which does not exceed 0.25 gram CaO per 100 ml., to an alkalinity above 0.00 gram CaO per 100 ml. but not exceeding 0.05 gram CaO per 100 ml., liming the juice thus stabilized by the addition of a liming reagent, subjecting the juice thus limed to carbonation in a primary saturation stage to an alkalinity of below 0.1 gram CaO per 100 ml., separating precipitates formed by said carbonation from the juice, further liming the thus separated juice by the addition of a liming reagent subjecting the thus further limed juice to carbonation in a secondary saturation stage to an alkalinity of about 0.08 gram CaO per 100 ml., and subjecting the thus carbonated juice to a further carbonation to an alkalinity of about 0.02 gram CaO per 100 ml.

2. A method for purification of sugar juice by liming and carbonation, comprising the steps of stabilizing the sugar juice by the addition thereto of a liming reagent, the alkalinity of which does not exceed 0.25 gram CaO per 100 ml., to an alkalinity above 0.00 gram CaO per 100 ml. but not exceeding 0.05 gram CaO per 100 ml., liming the juice thus stabilized by the addition thereto of a liming reagent, subjecting the juice thus limed to carbonation in a primary saturation stage to an alkalinity of below 0.1 gram CaO per 100 ml., adding $CaCO_3$ to the juice during said carbonation, separating precipitates formed by said carbonation from the juice, further liming the thus separated juice by the addition of a liming reagent, subjecting the thus further limed juice to carbonation in a secondary saturation stage to an alkalinity of about 0.08 gram CaO per 100 ml., and subjecting the thus carbonated juice to a further carbonation to an alkalinity of about 0.02 gram per 100 ml.

3. A method for purification of sugar juice by liming and carbonation, comprising the steps of stabilizing the sugar juice by addition thereto of a liming reagent, the alkalinity of which does not exceed 0.25 gram CaO per 100 ml., to an alkalinity above 0.00 gram CaO per 100 ml. but not exceeding 0.05 gram CaO per 100 ml., liming the juice thus stabilized by the addition thereto of a liming reagent, adding $CaCO_3$ to the juice prior to said liming, subjecting the juice thus limed to carbonation in a primary saturation stage to an alkalinity of about 0.08 gram CaO per 100 ml., separating precipitates formed by said carbonation from the juice, further liming the thus separated juice by the addition of a liming reagent, subjecting the thus further limed juice to carbonation in a secondary saturation stage to an alkalinity of about 0.08 gram CaO per 100 ml. and subjecting the thus carbonated juice to a second carbonation to an alkalinity of about 0.02 gram CaO per 100 ml.

4. A method as claimed in claim 3, in which at least a part of said $CaCO_3$ is added during the said stabilization of the juice.

5. A method as claimed in claim 3, in which precipitates resulting from the said second carbonation are separated from the juice and are used as at least a part of the said $CaCO_3$ addition.

6. A method as claimed in claim 3, in which precipitates resulting from the said carbonation in the said secondary saturation stage are separated from the juice and are used as at least a part of the said $CaCO_3$ addition.

7. A method as claimed in claim 3, in which the said separation of the precipitates resulting from the said carbonation in the said primary saturation stage is obtained by decanting, the sludge formed by this decanting is filtered, and the filtrate from this filtration is added to the juice prior to said renewed liming thereof.

8. A method of purification of sugar juice by liming and carbonation comprising the steps of adding a liming reagent to the juice, the alkalinity of which does not exceed 0.25 gram CaO per 100 ml. to an alkalinity above 0.00 gram CaO per 100 ml. but not exceeding 0.05 gram CaO per 100 ml., adding a further liming reagent until the juice has an alkalinity of above 0.2 gram CaO per 100 ml., preheating the thus limed juice to a temperature of 30–50° C. subjecting the juice to carbonation in a primary saturation stage to an alkalinity of less than 0.05 gram CaO per 100 ml., separating precipitates formed by said carbonation from the juice, further liming the juice by the addition of a liming reagent, subjecting the further limed juice to carbonation in a secondary saturation state to an alkalinity of about 0.08, heating the juice to a temperature of 70–90° C. prior to the last said carbonation, and subjecting the thus carbonated juice to a further carbonation to an alkalinity of about 0.02 gram CaO per 100 ml.

9. A method of purification of sugar juice by liming and carbonation, comprising the steps of adding to the juice a liming reagent, the alkalinity of which does not exceed 0.25 gram CaO per 100 ml., to an alkalinity above 0.00 gram CaO per 100 ml. but not exceeding 0.05 gram per 100 ml., adding of a further liming reagent until the juice has an alkalinity of above 0.2 gram CaO per 100 ml., preheating the thus limed juice to a temperature of 30–50° C., subjecting the juice to carbonation in a primary saturation stage to an alkalinity of less than 0.05 gram CaO per 100 ml., adding $CaCO_3$ to the juice prior to said carbonation, separating precipitates formed by said carbonation from the juice, further liming the juice by the addition thereto of a liming reagent, subjecting the further lined juice to a carbonation in a secondary saturation stage to an alkalinity of about 0.08 gram CaO per 100 ml., heating the juice to a temperature of 70–90° C. prior to the last said carbonation and subjecting of the thus carbonated juice to a further carbonation until an alkalinity of about 0.02 gram per 100 ml.

References Cited in the file of this patent

UNITED STATES PATENTS

| | | |
|---|---|---|
| 2,143,594 | Cowan | Jan. 10, 1939 |
| 2,164,186 | Brown | June 27, 1939 |
| 2,547,298 | Wiklund | Apr. 3, 1951 |
| 2,557,800 | Seailles | June 19, 1951 |
| 2,610,929 | B-Muller | Sept. 16, 1952 |

OTHER REFERENCES

The Int. Sugar Jour., March 1950, pages 69–71 (Wiklund).

Sugar, May 1942, pages 40 and 41 (Trojc).